United States Patent
Jain et al.

(10) Patent No.: US 7,848,327 B2
(45) Date of Patent: *Dec. 7, 2010

(54) METHODS AND APPARATUS FOR CREATING ADDRESSES

(75) Inventors: Vinit Jain, Austin, TX (US); Harvey G. Kiel, Rochester, MN (US); Jeffrey P. Messing, Austin, TX (US); Lee A. Sendelbach, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 127 days.

This patent is subject to a terminal disclaimer.

(21) Appl. No.: 12/037,738

(22) Filed: Feb. 26, 2008

(65) Prior Publication Data

US 2008/0144620 A1 Jun. 19, 2008

Related U.S. Application Data

(63) Continuation of application No. 10/845,499, filed on May 13, 2004, now Pat. No. 7,433,356.

(51) Int. Cl.
*H04L 12/56* (2006.01)

(52) U.S. Cl. .................. 370/392; 370/395.54; 370/471
(58) Field of Classification Search ....................... None
See application file for complete search history.

(56) References Cited

U.S. PATENT DOCUMENTS

| 6,856,591 | B1 * | 2/2005 | Ma et al. ..................... 370/216 |
| 6,859,826 | B2 * | 2/2005 | Bahlmann ................... 709/220 |
| 6,928,478 | B1 * | 8/2005 | Gangadharan .............. 709/226 |
| 6,977,939 | B2 | 12/2005 | Joy et al. |
| 7,039,828 | B1 * | 5/2006 | Scott ............................. 714/4 |
| 7,152,119 | B2 | 12/2006 | Na et al. |
| 7,260,737 | B1 * | 8/2007 | Lent et al. ...................... 714/5 |
| 7,457,300 | B2 | 11/2008 | Christensen et al. |
| 2003/0069993 | A1 * | 4/2003 | Na et al. ..................... 709/245 |
| 2004/0141468 | A1 * | 7/2004 | Christensen et al. ........ 370/252 |

* cited by examiner

*Primary Examiner*—Chi H Pham
*Assistant Examiner*—Soon-Dong D Hyun
(74) *Attorney, Agent, or Firm*—Dugan & Dugan, PC

(57) ABSTRACT

In a first aspect, a first method is provided for creating a media access control (MAC) address for a device. The first method includes the steps of (1) obtaining one or more identifiers; (2) obtaining a first MAC address; and (3) creating at least a second MAC address based on the one or more identifiers and the first MAC address. Numerous other aspects are provided.

10 Claims, 3 Drawing Sheets

US 7,848,327 B2

METHODS AND APPARATUS FOR CREATING ADDRESSES

The present application is a continuation of and claims priority to U.S. patent application Ser. No. 10/845,499, filed May 13, 2004, now U.S. Pat. No. 7,433,356 which is hereby incorporated by reference herein its entirety.

FIELD OF THE INVENTION

The present invention relates generally to computer systems, and more particularly to methods and apparatus for creating addresses for a computer system such as a server.

BACKGROUND

Media Access Control (MAC) addresses may be used for identifying and communicating with hardware, such as a network card included in a network device (e.g., a server) connected to a network. For certain applications, multiple MAC addresses may be associated with a network device. Selection of such MAC addresses is typically governed by various standards bodies (e.g., The Institute of Electrical and Electronics Engineers, Inc. (I.E.E.E.)), which renders selections of multiple MAC addresses per network card difficult. Accordingly, improved methods and apparatus for obtaining MAC addresses for a network device are desired.

SUMMARY OF THE INVENTION

In a first aspect of the invention, a method is provided for creating a media access control (MAC) address for a device. The method includes the steps of (1) obtaining one or more identifiers; (2) obtaining a first MAC address; and (3) creating at least a second MAC address based on the one or more identifiers and the first MAC address.

In a second aspect of the invention, a first apparatus is provided for creating a media access control (MAC) address for a device. The first apparatus includes a management tool adapted to couple to an Ethernet adapter and a partition. The management tool is further adapted to (1) obtain one or more identifiers; (2) obtain a first MAC address; and (3) create at least a second MAC address based on the one or more identifiers and the first MAC address.

In a third aspect of the invention, a second apparatus is provided for creating a media access control (MAC) address for a device. The second apparatus includes (1) a hosting partition; (2) one or more hosted partitions; (3) a processor, coupled to the hosting partition and the one or more hosted partitions; (4) an Ethernet adapter coupled to the hosting partition and the one or more hosted partitions; and (5) a management tool coupled to the hosting partition. The management tool is adapted to (1) obtain one or more identifiers; (2) obtain a first MAC address; and (3) create at least a second MAC address based on the one or more identifiers and the first MAC address. Numerous other aspects are provided, as are methods, systems, apparatus and computer program products in accordance with these other aspects of the invention. Each computer program product described herein may be carried by a medium readable by a computer (e.g., a carrier wave signal, a floppy disc, a compact disc, a DVD, a hard drive, a random access memory, etc.).

Other features and aspects of the present invention will become more fully apparent from the following detailed description, the appended claims and the accompanying drawings.

DETAILED DESCRIPTION

Certain applications may require a user of a server, such as a company, to associate multiple MAC addresses with the server (e.g., with various components of the server). In anticipation of the need to associate multiple MAC addresses with the server, while creating a MAC address for the server, the company may reserve MAC addresses for the server which may (or may not) be required by the server in the future. However, reserving MAC addresses for such eventualities is an inefficient allocation of MAC addresses. Further, reserving MAC addresses in the manner described above may not comply with the recommendations of some standards bodies. For example, 802 standard of the Institute of Electrical and Electronics Engineers (I.E.E.E.) does not recommend that users reserve MAC addresses. Further, for applications that require multiple MAC addresses to be associated with a server, a user typically is required to select one or more of the multiple MAC addresses to be associated with the server. Due to the structure of a MAC address, which is described in detail below, such a requirement is time-consuming and may be error prone.

The present invention relates to methods and apparatus for creating MAC addresses while avoiding the problems described above. For example, MAC addresses (e.g., default MAC addresses) may be created based on a first MAC address and one or more identifiers as described below.

Figure 1:
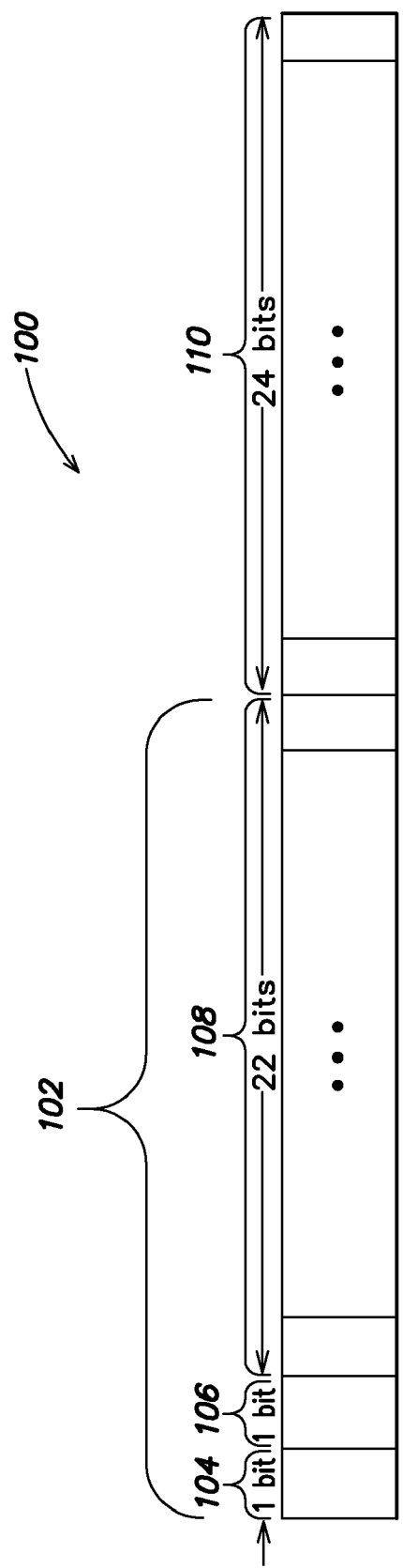
FIG. 1 is a block diagram of an exemplary Media Access Control (MAC) address.

FIG. 1 is a block diagram of an exemplary MAC address 100. The exemplary MAC address 100 is six bytes (e.g., 48 bits) long, although other sizes may be employed. One or more bits (e.g., twenty-four bits in the embodiment shown) of the MAC address 100 serve as an identifier. More specifically, the twenty-four most significant bits are an organizationally unique identifier (OUI) 102. A standards body (e.g., I.E.E.E.) issues one or more OUIs to users which manufacture network devices.

The most significant bit of the OUI 102 is an Individual Address/Group Address bit 104, which indicates whether the MAC address 100 is an individual address or a group address. For example, in one embodiment, if the Individual Address/Group Address bit 104 of the OUI is not asserted, the MAC address 100 is an individual address, such as a MAC address 100 for a server. Alternatively, if the Individual Address/Group Address bit 104 is asserted the MAC address 100 is a group address, which indicates that the MAC address 100 may be used to communicate with more than one network device.

The next most significant bit of the OUI 102 is a Universally/Locally Administered bit 106, which indicates whether the MAC address 100 is a universally administered or locally administered MAC address. If the Universally/Locally Administered bit 106 is set (e.g., asserted), the remaining forty-six bits of the MAC address 100 may be assigned any value by the user, thereby creating a locally administered MAC address 100. The locally administered MAC address 100 must be unique in the network (e.g., sub-network) in which the MAC address 100 is used. A remaining number of bits (e.g., twenty-two bits) 108 of the OUI 102 are assigned to vendors (e.g., users), for example, by an industry block (e.g., by a company, such as Intel). Vendors may be assigned one or more values for the remaining twenty-two bits 108. In this manner, a vendor may be assigned one or more OUIs 102. A remaining portion of the MAC address 100 (e.g., the twenty-four least significant bits) are vendor-defined bits 110. By assigning values to the OUI bits 102 and the vendor-defined bits 110, a 48-bit MAC address 100 is formed.

As described above a company, such as the vendor, may implement certain applications on a network device which may require multiple MAC addresses 100 to be associated with the network device (e.g., one or more components of the network device). For example, a vendor may implement a multiple logical partition (LPAR) server. Multiple LPAR servers are becoming popular because they allow users to consolidate separate smaller servers into a larger multiple partition server (e.g., a multiple LPAR server). Each partition of a multiple LPAR server may include and/or represents a separate operating system (OS) instance. The partitions may include and/or represent the same or different OSs. The partitions of a multiple LPAR server may perform I/O operations, for example, using respective I/O adapters.

As the number of partitions in a multiple LPAR server increases, the number of adapters (e.g., I/O adapters), the number of server slots to accommodate the adapters, and the amount of server management support required by the adapters increases. To reduce the costs associated with such hardware requirements, a multiple LPAR server may support hosting I/O and hosted I/O. More specifically, a multiple LPAR server may include a partition, which serves as a hosting partition and which is coupled to and owns an adapter (e.g., an I/O adapter) included in the multiple LPAR server. The hosting partition may represent a normal OS that may be supported by the multiple LPAR server. The remaining partitions in the multiple LPAR server may serve as hosted partitions that share the I/O adapter, thereby avoiding the costs associated with including a physical I/O adapter for each partition. I/O adapter sharing is referred to as virtualization.

A multiple LPAR server may not efficiently share an I/O adapter among multiple partitions. Consequently, according to an embodiment of the present invention, multiple MAC addresses are associated with a multiple LPAR server. For example, a MAC address may be created for and/or assigned to each hosted partition of the multiple LPAR server. In this manner, received frames may be switched quickly to the correct hosted partition without having to change MAC addresses in a hosting partition. While described with reference to a multiple LPAR server, it should be understood that the present invention may be employed by any application which requires multiple MAC addresses to be created for a network device, for example, based on a single MAC address.

Figure 2:
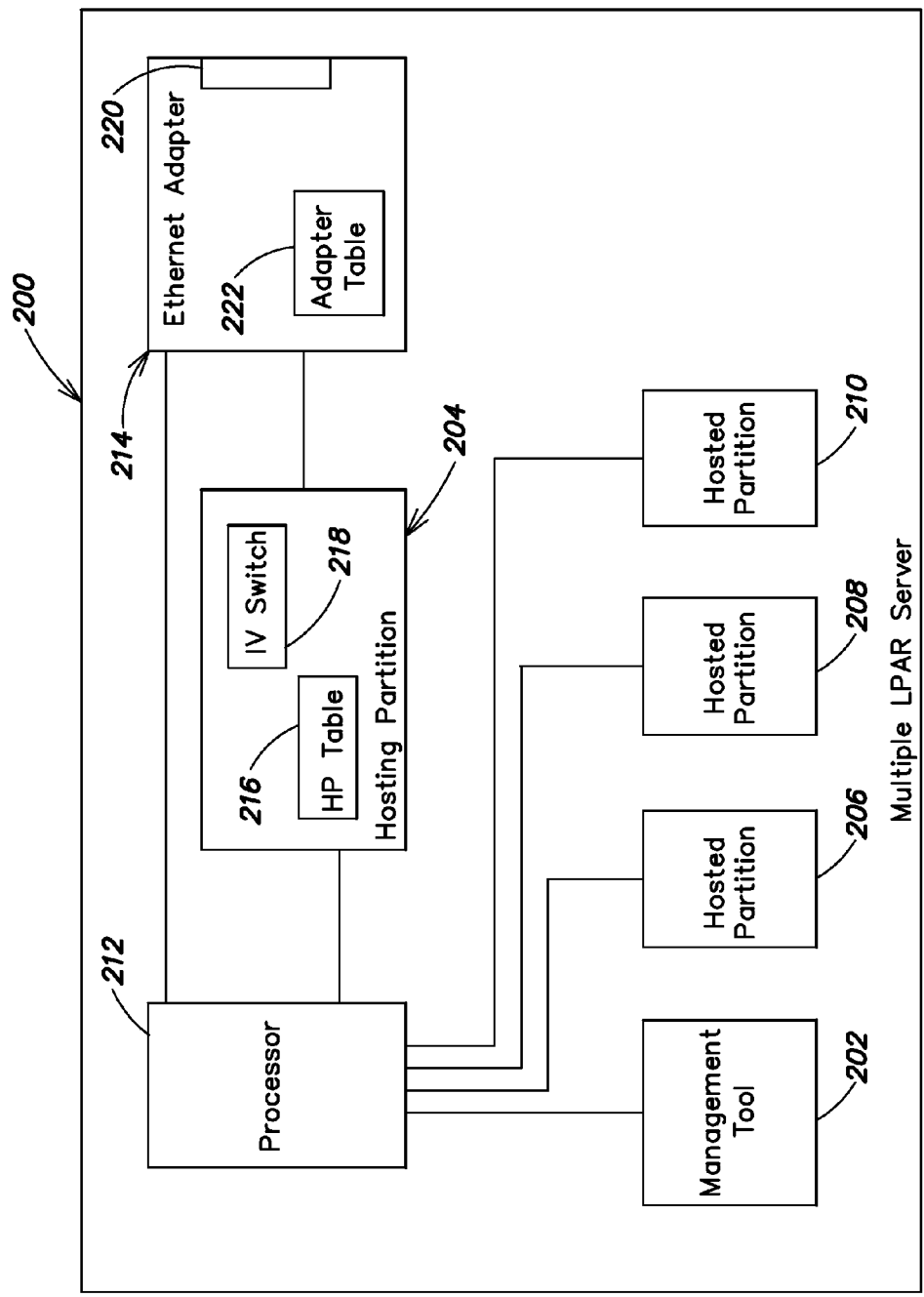
FIG. 2 is a block diagram of a multiple logic partition (LPAR) server, which includes a management tool, in accordance with an embodiment of the present invention.

FIG. 2 is a block diagram of a multiple LPAR server 200, which includes a management tool 202, in accordance with an embodiment of the present invention. The multiple LPAR server 200 may be, for example, a network device connected on a portion of the network. The multiple LPAR server 200 includes a hosting partition 204 and a plurality of hosted partitions 206-210 coupled to a processor 212. The multiple LPAR server 200 may include a larger or smaller number of processors 212. As described above, each of the partitions represents a separate OS instance. The processor 212 or a fraction of the processor 212 is adapted to share multiple LPAR server resources among the hosting partition 204 and hosted partitions 206-210, for example, by execution firmware.

The management tool 202 may be used to configure the multiple LPAR server 200. For example, the management tool 202 is used to define partitions 204-210 of the server 200, assign an I/O adapter to a partition (e.g., the hosting partition 204) and configure which hosted partitions 206-210 are allowed to share the I/O adapter with the hosting partition 204. The management tool 202 is adapted to obtain one or more identifiers (e.g., OUIs 102), obtain a first MAC address (e.g., a fixed MAC address of the I/O adapter), and create at least a second MAC address based on the one or more identifiers and the first MAC address as described further below. The management tool 202 may be implemented, for example, using a suitable combination of logic (e.g., OR logic). Although the management tool 202 shown in FIG. 2 is included in the multiple LPAR server 200, the management tool 202 may be external to the multiple LPAR server 200. Fewer or more hosted partitions may be employed.

The hosting partition 204 is coupled to and owns the I/O adapter (e.g., Ethernet adapter 214) included in the server 200. Further, the hosting partition 204 allows the hosted partitions 206-210 to share the Ethernet adapter 214, and assigns MAC addresses 100 created by the management tool 202 to hosted partitions 206-210. The hosted partition may test the created MAC addresses, for example, before assigning them to the hosted partitions 206-210.

The hosting partition 204 also includes a hosting partition (HP) table 216. The hosting partition table 216 includes entries which indicate a hosted partition 206-210 and a corresponding MAC address 100 assigned to the hosted partition 206-210. The hosting partition 204 further includes an internal virtual (IV) switch 218 adapted to observe and route traffic in the multiple LPAR server 200. The IV switch 218 knows the MAC addresses of all partitions 204-210 and may route frames without performing any MAC address conversion. The IV switch 218 is implemented in software.

As stated, the I/O adapter (e.g., Ethernet adapter 214) includes a fixed (e.g., burned in) MAC address 100. The Ethernet adapter 214 also includes a physical interface 220 adapted to couple to a network connection via an external connector (not shown), such as an Ethernet cable. An adapter table 222 of the Ethernet adapter 214 is adapted to store the MAC addresses associated with partitions (e.g., hosted partitions 206-210) included in the multiple LPAR server 200.

The management tool 202 may create MAC addresses for the multiple LPAR server 200 as described with reference to FIGS. 1-2 and with reference to FIG. 3 which illustrates a method 300 for creating a MAC address in accordance with an embodiment of the present invention.

Figure 3:
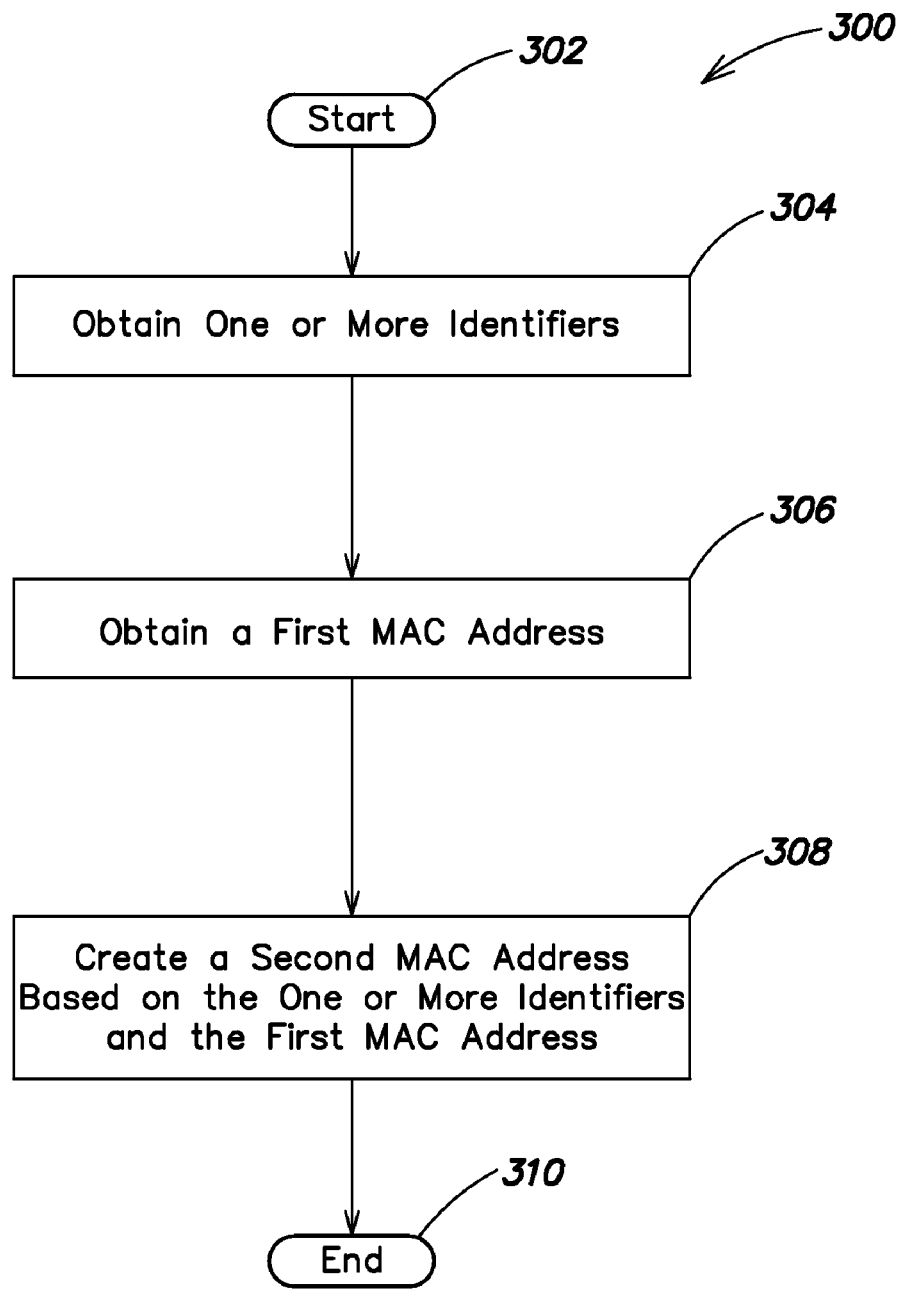
FIG. 3 illustrates a method for creating a MAC address for a device in accordance with an embodiment of the present invention.

With reference to FIG. 3, in step 302, the method 300 begins. In step 304, one or more identifiers (OUIs 102) issued to the user are obtained. For example, the OUIs 102 may be input to the management tool 202. Other identifiers may be used.

In step 306, a first MAC address is obtained. For example, the MAC address of an I/O adapter (e.g., Ethernet adapter 214) included in a network device, such as a multiple logical partition (LPAR) server 200, is obtained. The management tool 202 included in the multiple LPAR server 200 may automatically determine (e.g., detect) the MAC address of the Ethernet adapter 214. For example, a hosting partition 204 of the multiple LPAR server 200 may provide the MAC address automatically to the management tool 202. Therefore, a user, such as a system administrator, is not required to input the MAC address into the management tool 202. More specifically, the Ethernet adapter 214 knows its MAC address and software may be employed to retrieve such MAC address and provide the MAC address to the management tool 202. Alternatively, the user may obtain the first MAC address and may input the MAC address of the Ethernet adapter 214 into the management tool 202.

In step 308, at least a second MAC address (e.g., additional MAC address) is created based on the one or more identifiers and the first MAC address. To create the additional MAC addresses (e.g., default MAC addresses), the management tool 202 (or a user) may create a mask that may be applied to the first MAC address 100. The mask may be used to identify bits of the various OUIs 102 that may be assigned to the vendor which are not asserted in any of the OUIs. For example, such bits are implemented as counter bits. The counter bits may indicate a component (e.g., a partition 206-210) number in a network device, such as the multiple LPAR 200, which requires multiple MAC addresses. To create the mask the vendor-defined bits 110 of the first MAC address (e.g., the MAC address 100 of the Ethernet adapter 214) are not changed. The user or management tool 202 may determine which bits of the various OUIs 102 that may be assigned to the vendor may be asserted in one of the OUIs 102. Corresponding bits of the first MAC address are not changed. During such an algorithm, the Universally/Locally Administered bit 106 is turned on (e.g., asserted). Therefore, the OUI bits of the newly created MAC address 100 may indicate an OUI 102 that is not issued to the vendor and still comply with standards.

Using the above algorithm, the management tool 202 (or a user) may create at least a second MAC address (e.g., an additional MAC address) based on one or more OUIs 102 issued to a vendor and the MAC address of an I/O adapter created for the vendor. The additional MAC addresses may be employed by components (e.g., partitions 206-210) of a network device, such as the multiple LPAR server 200, which includes the I/O adapter. In this manner, the additional MAC addresses should be unique across vendor servers implementing the present invention. It should be noted, once the MAC addresses are respectively employed by components of the network device (e.g., once the network device is configured), the network device may employ the same respective MAC addresses for the components during each Initial Program Load (e.g., reboot).

In step 310, the method 300 ends. Through the use of the method 300 of FIG. 3, additional MAC addresses (e.g., default MAC addresses) may be easily created based on one MAC address and one or more identifiers. The additional MAC addresses are standards compliant.

For an embodiment of the present invention in which the multiple LPAR server 200 is connected to a portion of a network (e.g., subnet), a newly created additional MAC address may be tested to ensure the MAC address is not being used by another network device connected to the same portion of the network. During configuration of the multiple LPAR server 200, for example, the hosting partition 204 may receive one or more of the additional MAC addresses. The hosting partition 204 ensures that an additional MAC address (e.g., a second MAC address) is unique across the portion of the network before employing the additional MAC address, thereby minimizing the chance of a collision with another locally administered MAC address on the subnet. That is, the hosting partition 204 determines whether the second MAC address is already used by another device on the portion of the network to which the multiple LPAR server 200 is connected. For example, the hosting partition 204 may send a test frame (e.g., an I.E.E.E. test frame), which is the MAC sublayer's equivalent of the IP layer's ping command, to the newly created second MAC address (e.g., before employing the second MAC address). If a target station (e.g., another device) with this MAC address receives the test frame, the other device must respond to the test frame by sending the same data included in the incoming test frame. Therefore, if the hosting partition 204 receives a response to the test frame sent to the second MAC address, the hosting partition 204 will bypass (e.g., automatically) the second MAC address (e.g., will not employ the second MAC address). Thereafter, the hosting partition 204 automatically may test the next newly created MAC address (e.g., a third MAC address) in a similar manner.

However, if the hosting partition 204 does not receive a response to the test frame sent to the second MAC address, the hosting partition 204 may employ the second MAC address. More specifically, the hosting partition 204 may assign (e.g., send) the second MAC address to a hosted partition 206-210 included in the multiple LPAR server 200. The hosting partition 204 stores a master table (e.g., hosting partition table 216) which includes entries for hosted partitions 206-210 that may share the Ethernet adapter 214 owned by the hosting partition 204, and MAC addresses assigned to the hosted partitions 206-210. The hosting partition 204 updates the hosting partition table 216 to include an entry for a hosted partition 206-210 and the newly-created (second) MAC address corresponding to the hosted partition 206-210. The hosting partition 204 also sends and writes the newly-created MAC address to the Ethernet adapter 214. For example, the adapter table 222 of the Ethernet adapter 214, which includes MAC addresses assigned to the Ethernet adapter 214 (e.g., MAC addresses of hosted partitions 206-210 that share the Ethernet adapter 214), is updated to include the newly-created MAC address. In this manner, the newly-created MAC address is assigned to the Ethernet adapter 214. Similarly, a MAC address which is no longer assigned to a hosted partition 206-210 may be removed from the Ethernet adapter 214. In one embodiment, sixteen MAC addresses may be assigned to the Ethernet adapter 214. More or less user-defined MAC addresses may be supported by the Ethernet adapter 214. In at least one embodiment, MAC addresses assigned to the Ethernet adapter 214 may be added or removed dynamically.

Additionally or alternatively, the hosting partition 204 may send a test frame to the MAC address employed by (e.g., assigned to) a hosted partition 206-210 when the hosted partition 206-210 comes up or is activated (e.g., during a hosted partition device driver open/vary on) after being down. A hosted partition 206-210 may be down, for example, because the hosted partition's application was no longer needed or because of maintenance. The hosting partition 204 is notified (via handshaking initiated by the hosted partition 206-210 for sharing the Ethernet adapter 214 with the hosting partition 204) when a hosted partition 206-210 comes up. In this manner, the hosting partition 204 may determine whether the MAC address assigned to the hosted partition 206-210 is used by another device on the portion of the network to which the multiple LPAR server 200 is connected and proceed in a manner similar to that described above to assign a new MAC address to the hosted partition 206-210.

Because the hosting partition 204 sends the test frame, hosted partitions 206-210 of the multiple LPAR server 200, which may be different OSs, do not have to accommodate the test frame overhead. A user may configure, for example, via the management tool 202, when a test frame is sent. The user may configure the multiple LPAR server 200 to send a test frame to a MAC address when creating a hosted partition 206-210 (e.g., during initial configuration) of the multiple LPAR server 200. Alternatively or additionally, as mentioned above, the multiple LPAR server 200 may be configured to send a test frame each time a hosted partition 206-210 comes up. Alternatively, a customer may configure the multiple LPAR server 200 to never send a test frame.

As described above, a user may create and specify (e.g., manually) a MAC address which is assigned to hosted partitions 206-210 of the multiple LPAR server 200. Similar to the method described above for default MAC addresses, test frames may be sent to user-specified MAC addresses to ensure the user-specified MAC addresses are unique across the portion of the network to which the multiple LPAR server 200 is connected. For example, if the hosting partition 204 determines a user-specified MAC address is used by another device and the portion of the network to which the multiple LPAR server 200 is coupled, the multiple LPAR server 200 (e.g., the management tool 202) may output an error message for the user.

Rather than specifying a single MAC address to be assigned to a hosted partition 206-210, a user, alternatively, may specify a MAC address which starts a range of MAC addresses (e.g., using the partition management tool 202). The hosted partition 206-210 may test if the MAC address in the range and proceed (e.g., assign unused MAC addresses in the range to partitions (e.g., hosted partitions 206-210) of the multiple LPAR server 200) in a manner similar to the method described above. In this manner, the user may control ranges of locally administered MAC addresses.

Using the same MAC address (e.g., duplicate MAC addresses) for more than one device on the subnet causes a duplicate MAC address error. In one or more embodiments, the hosting partition 204 may include an internal virtual switch 218. The internal virtual switch 218 may determine whether (e.g., detect when) two devices on the subnet are using the same MAC address. Two devices may mistakenly use the same MAC address when a second device powers up on the subnet using a MAC address previously assigned to another device, such as a hosted partition 206-210 included in the multiple LPAR server 200. If the internal virtual switch 218 detects a device using a MAC address, which was previously assigned to a hosted partition 206-210 of a multiple LPAR server 200, on the subnet to which the multiple LPAR server 200 is coupled, the internal virtual switch 218 may assign a different MAC address to the hosted partition 206-210 and update (e.g., automatically update) a corresponding entry stored in the adapter table 222 of the Ethernet adapter 214 to include the newly assigned MAC address, thereby assigning a new MAC address to the Ethernet adapter 214. In this manner, the hosting partition 204 and/or the internal virtual switch 218 may detect the use of duplicate MAC addresses and/or a resulting duplicate MAC address error during operation of the multiple LPAR server 200 (e.g., at run time) and automatically recover using the method described above.

The foregoing description discloses only exemplary embodiments of the invention. Modifications of the above disclosed apparatus and methods which fall within the scope of the invention will be readily apparent to those of ordinary skill in the art. In one embodiment, the hosting partition 204 is configured to send a test frame during initial configuration (e.g., of a hosted partition 206-210) by default. Another default setting may be employed. Although in one or more of the above embodiments, the multiple LPAR server 200 includes one Ethernet adapter 214, the multiple LPAR server 200 may include more than one Ethernet adapter 214. Further, in such embodiments, the hosting partition 204 may employ Ethernet adapter link aggregation, which groups (e.g., aggregates) multiple Ethernet adapters 214 together to create one virtual adapter. Ethernet adapter link aggregation improves performance and availability of the link (e.g., network connection) and the multiple LPAR server 200. In some embodiments, the MAC address (e.g., a fixed MAC address) of one of the Ethernet adapters grouped together serves as a base MAC address. Additional MAC addresses (e.g., default MAC addresses) for hosted partitions 206-210 may be created from the base address using the present methods and apparatus. In one or more other embodiments, rather than an Ethernet adapter 214, a multiple LPAR server 200 may include a fixed (e.g., burned in) MAC address, which serves as a base address from which one or more locally administered MAC addresses for hosted partitions 206-210 are created.

As stated, in one or more embodiments, bits of the various organizationally unique identifiers (OUIs) 102 that are assigned to a user (e.g., a vendor), which may be asserted in one of the OUIs 102, are not changed while creating new MAC addresses. The remaining bits serve as counter bits. However, in other embodiments, some of the OUI bits which may be asserted in one of the OUIs 102 may also serve as counter bits. For example, if a user only asserts certain OUI bits for non-Ethernet adapters, those bits may also serve as counter bits when creating MAC addresses for a multiple LPAR server 200 including an Ethernet adapter 214.

Accordingly, while the present invention has been disclosed in connection with exemplary embodiments thereof, it should be understood that other embodiments may fall within the spirit and scope of the invention, as defined by the following claims.

The invention claimed is:

1. A method for creating a media access control (MAC) address for a first device, comprising:
   obtaining one or more identifiers with a management tool coupled to a processor in a multiple logical partition server having at least a hosting partition and a plurality of hosted partitions;
   obtaining a first MAC address of an Input/Output (I/O) adapter coupled to the processor;
   creating at least a second MAC address with the management tool based on the one or more identifiers and the first MAC address;
   employing the second MAC address to a first hosted partition; and
   associating in the hosting partition the first hosted partition and the second MAC address.

2. The method of claim 1 wherein the one or more identifiers are organizationally unique identifiers.

3. The method of claim 1 wherein the second MAC address is unique across a portion of a network.

4. The method of claim 1 further comprising assigning the second MAC address to a hosted partition of the multiple logical partition server, wherein the hosted partition shares the Ethernet adapter with a hosting partition of the logical partition server.

5. An apparatus for creating a media access control (MAC) address for a first device, comprising:
   a management tool coupled to an Input/Output (I/O) adapter that:
      obtains one or more identifiers;
      obtains a first MAC address of the I/O adapter; and
      creates at least a second MAC address based on the one or more identifiers and the first MAC address;
   a plurality of hosted partitions coupled to the management tool; and
   a hosting partition coupled to the management tool that employs the second MAC address to a first hosted partition and associates the first hosted partition and the second MAC address.

6. The apparatus of claim 5 wherein the first MAC address is a fixed address of the I/O adapter.

7. The apparatus of claim 5 wherein the one or more identifiers are organizationally unique identifiers.

8. The apparatus of claim 5 wherein the second MAC address is unique across a portion of a network.

9. The apparatus of claim 5
wherein the hosted partitions share the I/O adapter with the hosting partition; and
wherein the hosted partitions and the hosting partition are included in a multiple logical partition server.

10. A non-transitory computer readable medium encoded with computer executable instructions comprising:
a medium readable by a computer, the computer readable medium having computer program code that when executed by the computer causes the computer to:
obtain one or more identifiers;
obtain a first MAC address;
create at least a second MAC address based on the one or more identifiers and the first MAC address;
employs the second MAC address to a first hosted partition; and
associates the first hosted partition and the second MAC address.

* * * * *